(12) United States Patent
Tan et al.

(10) Patent No.: US 9,690,007 B2
(45) Date of Patent: Jun. 27, 2017

(54) DEVICE AND METHOD FOR COMPARISON OF MULTIPLE TROPICAL CYCLONE ROUTES

(71) Applicant: National Taiwan University, Taipei (TW)

(72) Inventors: Yih-Chi Tan, Taipei (TW); Jihn-Sung Lai, Taipei (TW); Wei-Chuan Hsieh, Taipei (TW); Shih-Chung Kang, Taipei (TW); Ruei-Shiue Shiu, Kaohsiung (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 416 days.

(21) Appl. No.: 14/278,393

(22) Filed: May 15, 2014

(65) Prior Publication Data
US 2015/0332146 A1    Nov. 19, 2015

(51) Int. Cl.
*G06F 17/00* (2006.01)
*G06F 17/20* (2006.01)
*G01W 1/00* (2006.01)
*G06N 5/04* (2006.01)
*G06N 7/00* (2006.01)

(52) U.S. Cl.
CPC ............... *G01W 1/00* (2013.01); *G06N 5/04* (2013.01); *G06N 7/00* (2013.01)

(58) Field of Classification Search
USPC .......................................................... 706/11
See application file for complete search history.

(56) References Cited

U.S. PATENT DOCUMENTS

| | | | | |
|---|---|---|---|---|
| 7,584,133 B2* | 9/2009 | Horowitz | ............... | G06Q 40/06 705/36 R |
| 7,584,134 B2* | 9/2009 | Horowitz | ............... | G06Q 40/00 705/36 R |
| 7,593,883 B2* | 9/2009 | Horowitz | ............... | G06Q 40/06 705/36 R |
| 7,783,542 B2* | 8/2010 | Horowitz | ............... | G06Q 40/00 705/35 |
| 7,783,543 B2* | 8/2010 | Horowitz | ............... | G06Q 40/00 705/35 |
| 7,783,544 B2* | 8/2010 | Horowitz | ............... | G06Q 40/00 705/35 |

(Continued)

OTHER PUBLICATIONS

Parker, Hurricane-tracking apps for iOS [online], Aug. 25, 2011 [retrieved on Jun. 21, 2016]. Retrieved from the Internet<URL:http://download.cnet.com/blog/download-blog/hurricane-tracking-apps-for-ios/>.*

(Continued)

*Primary Examiner* — Michael B Holmes
(74) *Attorney, Agent, or Firm* — patenttm.us (57) ABSTRACT

The present invention relates to a method for comparison of multiple tropical cyclone routes. The method is implementable through a mobile device having an application processor and a touch-sensed display. The method is capable of determining multiple reference cyclone routes relevant to an concerned cyclone route by comparing each of multiple historical cyclone routes, each of which routes consists of multiple cyclone center coordinates, with an estimated cyclone route consisting of multiple estimated cyclone center coordinates for representing the concerned cyclone route.

10 Claims, 9 Drawing Sheets

(56) References Cited

U.S. PATENT DOCUMENTS

| | | | | |
|---|---|---|---|---|
| 7,917,420 B2* | 3/2011 | Horowitz | ............... | G06Q 40/00 705/35 |
| 7,917,421 B2* | 3/2011 | Horowitz | ............... | G06Q 40/00 705/35 |
| 8,055,563 B2* | 11/2011 | Horowitz | ............... | G06Q 10/04 705/35 |
| 8,266,042 B2* | 9/2012 | Horowitz | ........... | G06Q 30/0283 705/35 |
| 2015/0332146 A1* | 11/2015 | Tan | ......................... | G06N 7/00 706/11 |

OTHER PUBLICATIONS

A Neural Network Approach to Estimate Tropical Cyclone Heat Potential in the Indian Ocean M. M. Ali; P. S. V. Jagadeesh; I. -I.Lin; Je-Yuan Hsu IEEE Geoscience and Remote Sensing Letters Year: 2012, vol. 9, Issue: 6 pp. 1114-1117, DOI: 10.1109/LGRS.2012.2190491 IEEE Journals & Magazines.*

Airport delay prediction using weather-impacted traffic index (WITI) model Alexander Klein 29th Digital Avionics Systems Conference Year: 2010 pp. 2.B.1-1-2.B.1-13, DOI: 10.1109/DASC.2010.5655493 IEEE Conference Publications.*

Solicitation-based Forwarding for Sensor Networks Seoung-bumn Lee; Kyung Joon Kwak; Andrew T. Campbell 2006 3rd Annual IEEE Communications Society on Sensor and Ad Hoc Communications and Networks Year: 2006, vol. 1 pp. 90-99, DOI: 10.1109/SAHCN.2006.288413 IEEE Conference Publications.*

Hurricane tracking via backpropagation neural network G. P. Johnson; F. C. Lin Neural Networks, 1995. Proceedings., IEEE International Conference on Year: 1995, vol. 2 pp. 1103-1106 vol. 2, DOI: 10.1109/ICNN.1995.487576 IEEE Conference Publications.*

Shih-Chung Kang, Zong-Han Wu, Yi-Chu Chen, Ruei-Shiue Shiu, Shih-Kun Chuang, Meng-Han Tsai & Jihn-Sung Lai, "Searching Program for Searching Historical Typhoon Events Based on the Humanity Operation", Disaster Management Society of Taiwan, online e-paper, Special Column, vol. 1, No. 12, May 2013, published online on May 15, 2013, Chinese website, Taiwan.

* cited by examiner

DEVICE AND METHOD FOR COMPARISON OF MULTIPLE TROPICAL CYCLONE ROUTES

FIELD

The present invention relates to a device and a method for comparison of multiple tropical cyclone routes. In particular, it relates to a device and a method for comparing respective multiple historical tropical cyclone routes with an estimated cyclone route to determine multiple resembling historical tropical cyclone routes similar to the estimated cyclone route.

BACKGROUND

Figure 1:
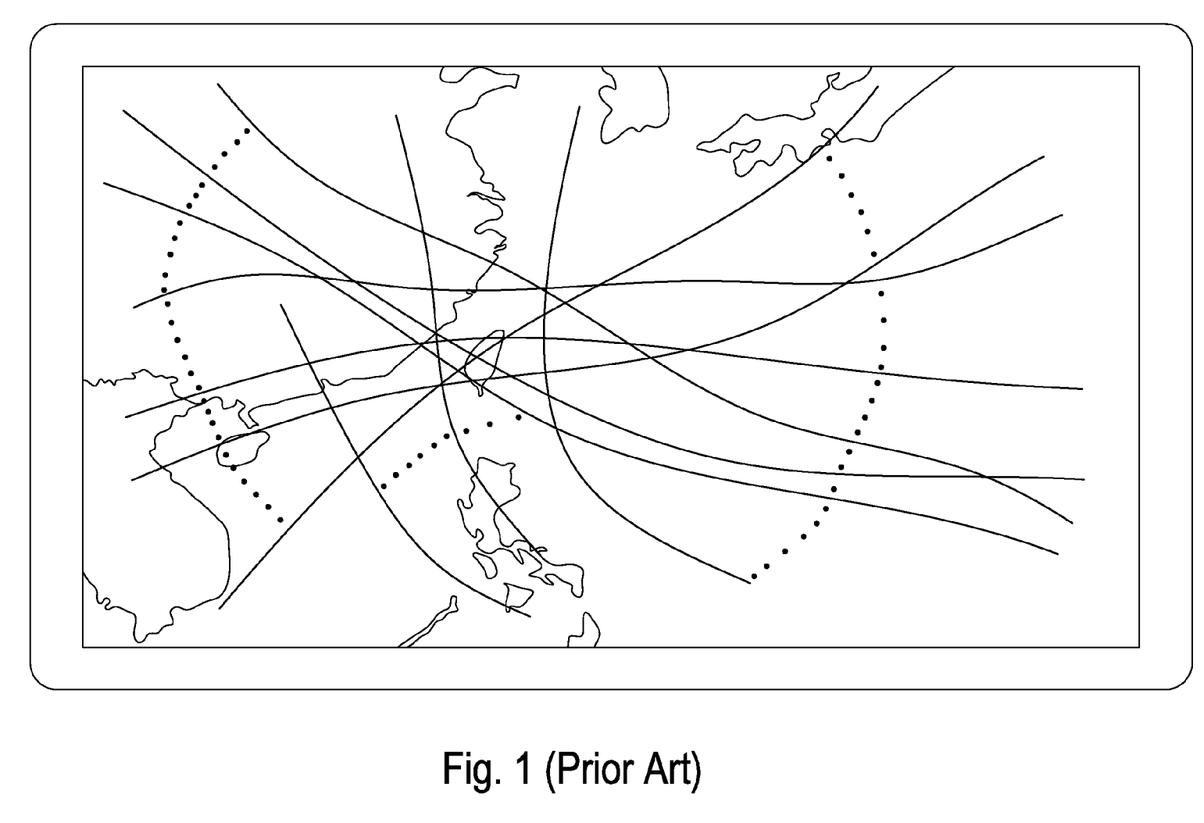
FIG. 1 shows a schematic diagram illustrating a track map for all historical tropical cyclones that approach to Taiwan in the Northwest Pacific Ocean during 1958 to 2012.

A tropical cyclone, which is also referred to as the typhoon, is basically a large-scale powerful cyclonic vortex and typically incubated and develops in the western part of the North Pacific Ocean between 180° and 100° E and the South China Sea. Multiple typhoons intensively burst in these regions during the summer season and often have a relatively high intensity above the mean intensity of the historical typhoon events. FIG. 1 shows a schematic diagram illustrating a track map for all historical tropical cyclone events that approach to Taiwan in the Northwest Pacific Ocean during 1958 to 2013. Through a due statistical analysis, there are totally 386 typhoon events occurred in the Northwest Pacific Ocean during the aforementioned period (it schematically shows ten typhoon tracks in FIG. 1).

Usually the conventional scheme to compare the typhoon tracks is first to filter and then sort the historical typhoon event data, according to certain specific pattern or classification announced by official weather authority. Then a meteorological forecaster manually identifies the resembling tracks of the historical typhoon events similar to the current typhoon track from the filtered and sorted data, in comparison with the current typhoon movement and based on personal past experiences, to forecast the future path and next movement for the current typhoon event.

However, since the track comparison and the similar tracks must be effectively determined before the typhoon hits the potential area, if the next movement thereof is ambiguous, for example, the typhoon just sticks to a certain location or circles around a specific location, even the most sophisticated senior forecaster fails the forecast and predication. The typhoon brings severe weather such as destructive wind and heavy rain etc., which always causes natural disasters such as, landslide and flood etc.

There is a need to solve the above deficiencies/issues.

SUMMARY

The present invention provides a method for the comparison of multiple tropical cyclone routes. The method is implementable through a mobile device having an application processor and a touch-sensed display to determine multiple reference cyclone routes for a concerned cyclone route and includes the steps of establishing multiple H historical cyclone routes corresponding to multiple H historical cyclone events; inputting a series of the M estimated cyclone center coordinates to represent a concerned cyclone route for a concerned cyclone event by the touch-sensed display; computing multiple H×M minimum distances between each of the M estimated cyclone center coordinates and the respective H historical cyclone routes, in which each of the M estimated cyclone center coordinates is correspondent to H minimum distances and each of H historical cyclone routes is correspondent to M minimum distances, by the application processor; for the respective H historical cyclone routes, rendering the estimated cyclone center coordinates correspondent to the minimum distance less than a given radius to be weighted and summating the weighted results; ordering the summated results from big down to small for the H historical cyclone routes by the application processor; and selecting the historical cyclone routes ranked within a specific ranking threshold as the reference cyclone routes relevant to the concerned cyclone route by the application processor.

The present invention further provides a device for the comparison of multiple tropical cyclone routes. The device is capable of determining multiple reference cyclone routes relevant to an concerned cyclone route by comparing each of totally H historical cyclone routes, each of which routes consists of totally $N=\{N_1, N_2, N_3, \ldots, N_H\}$ cyclone center coordinates $P=\{P_1, P_2, P_3, \ldots, P_H\}$, with an estimated cyclone route consisting of totally M estimated cyclone center coordinates for representing the concerned cyclone route. The device includes a touch-sensed display which is configured to receive a series of the totally M estimated cyclone center coordinates to form the estimated cyclone route and an estimated coordinate set $U=\{U_1, U_2, U_3, \ldots, U_M | U_k=(x_k,y_k)\}$; and an application processor which is electrically connected with the touch-sensed display and configured to compute totally M×H minimum distances between each of the totally M estimated cyclone center coordinates and the respective totally H historical cyclone routes, to render the estimated cyclone center coordinates correspondent to the minimum distance less than a given radius to be weighted and summate the weighted results for the respective H historical cyclone routes, to order the summated results from big down to small, and to select the historical cyclone routes ranked within a specific ranking threshold as the reference cyclone routes relevant to the concerned cyclone route.

DESCRIPTION OF THE DRAWINGS

A more complete appreciation of the invention and many of the attendant advantages thereof are readily obtained as the same become better understood by reference to the following detailed description when considered in connection with the accompanying drawing, wherein:

FIGS. 5(a)~5(e) show a series of schematic diagrams illustrating the user interface scene demonstrated on the touch-sensed screen of the comparison device while implementing the comparison method thereon in accordance with the present invention;

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Figure 2:
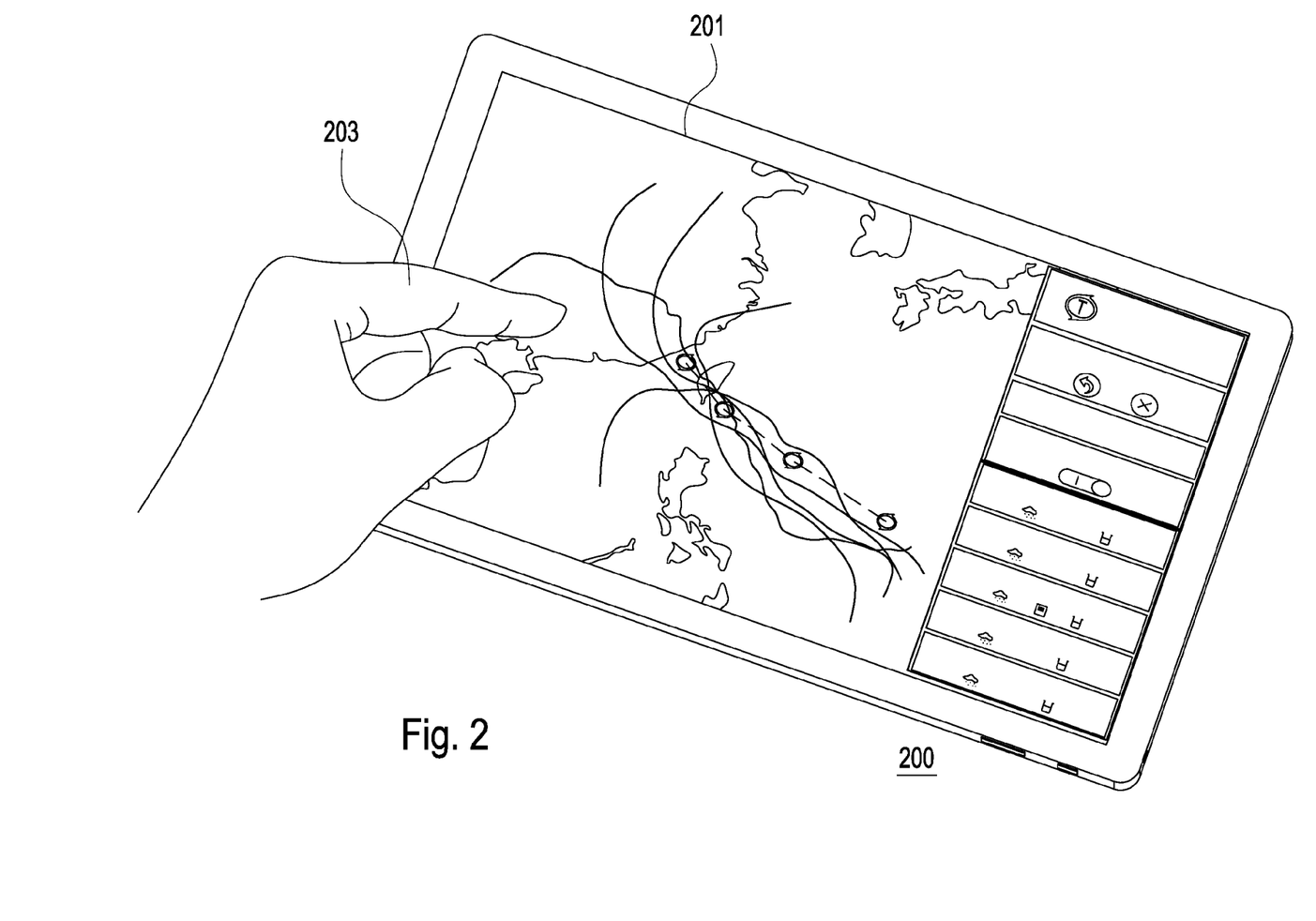
FIG. 2 shows a schematic diagram illustrating a comparison device architecture configured to compare multiple tropical cyclone routes.

FIG. 2 shows a schematic diagram illustrating a comparison device architecture configured to compare multiple tropical cyclone routes. The comparison device 200 includes a touch-sensed display 201 and an application processor (not shown in FIG. 2). The present invention presents a comparison method for the comparison of multiple tropical cyclone routes, which is implementable through the comparison device 200 as shown in FIG. 2. The comparison method is performed to compare an estimated route representing for an concerned developing tropical cyclone with multiple historical tropical cyclone routes to determine multiple resembling historical tropical cyclone routes similar to the estimated route. Any user can perform the comparison method in accordance with the present invention simply through operating the comparison mobile 200 by finger 203 touches or finger gestures. The comparison device 200 is preferably a mobile device, a smart phone, a tablet computer, a phablet or a notebook computer with a touch screen.

Generically, the comparison method for comparison of multiple tropical cyclone routes in accordance with the present invention is performed to determine multiple reference cyclone routes similar to an concerned cyclone route. There are totally H historical cyclone routes and each of routes consists of totally $N=\{N_1, N_2, N_3, \ldots, N_H\}$ cyclone center coordinates $P=\{P_1, P_2, P_3, \ldots, P_H\}$. There is further an estimated cyclone route consisting of totally M estimated cyclone center coordinates for representing the concerned cyclone route.

First a series of the totally M estimated cyclone center coordinates is inputted by user through the touch-sensed display. The application processor receives totally M estimated cyclone center coordinates to form the estimated cyclone route and an estimated coordinate set $U=\{U_1, U_2, U_3, \ldots, U_M | U_k=(x_k, y_k)\}$. Next, totally M×H minimum distances between each of the totally M estimated cyclone center coordinates and the respective totally H historical cyclone routes are computed by the application processor.

Then the application processor weights the estimated cyclone center coordinates, correspondent to the minimum distance less than a given radius, selected from the M estimated cyclone center coordinates, according to the inputted sequence thereof and with a weighting coefficient w and summates the weighted results for the respective H historical cyclone routes, then orders the summated results from big down to small by the application processor, and finally selects the historical cyclone routes ranked within a specific ranking threshold as the reference cyclone routes relevant to the concerned cyclone route.

In detail, the comparison method is capable of determining multiple reference cyclone routes relevant to an concerned cyclone route by comparing each of totally H historical cyclone routes, each of which routes consists of totally $N=\{N_1, N_2, N_3, \ldots, N_H\}$ cyclone center coordinates, with an estimated cyclone route consisting of totally M estimated cyclone center coordinates.

In order to perform the whole method, a series of the totally M estimated cyclone center coordinates is first inputted by user through the touch-sensed display to form the estimated cyclone route and an estimated coordinate set $U=\{U_1, U_2, U_3, \ldots, U_M | U_k=(x_k, y_k)\}$.

Second, multiple coordinate sequence sets $P=\{P_1, P_2, P_3, \ldots, P_H\}$ for the totally H historical cyclone routes are formed by the application processor, each of which sets $P_i=\{P_{i1}, P_{i2}, P_{i3}, \ldots, P_{iN_i} | P_{ij}=(x_{ij}, y_{ij})\}$ includes the totally $N=\{N_1, N_2, N_3, \ldots, N_H\}$ cyclone center coordinates, each of which coordinates is periodically recorded at the end of each invariant time interval. The invariant time interval is preferably a 6-hour period, for example.

Next, multiple distance values, each of which values is a linear distance between $j^{th}$ cyclone center coordinates of the totally $N=\{N_1, N_2, N_3, \ldots, N_H\}$ cyclone center coordinates for $i^{th}$ historical cyclone route of the totally H historical cyclone routes and $k^{th}$ estimated cyclone center coordinate of the totally M estimated cyclone center coordinates are computed by the application processor, to further form a distance value set $$D = \left\{ \begin{array}{l} D_{i11}, D_{i12}, D_{i13}, \ldots, D_{i1M}, \\ D_{i21}, D_{i22}, D_{i23}, \ldots, D_{i2M}, \\ D_{i31}, D_{i32}, D_{i33}, \ldots, D_{i3M}, \\ \ldots \\ D_{iN_i1}, D_{iN_i2}, D_{iN_i3}, \ldots, D_{iN_iM} \end{array} \middle| D_{ijk} = |P_{ij} - U_k| \right\}.$$

Consequently, multiple minimum distances $$d_{ik} = min_j \left( D_{ijk} \middle| \begin{array}{l} i = 1, 2, 3, \ldots, H; \\ j = 1, 2, 3, \ldots, N_i; \\ k = 1, 2, 3, \ldots, M \end{array} \right)$$

between $k^{th}$ estimated cyclone center coordinate of the totally M estimated cyclone center coordinates and $i^{th}$ historical cyclone route of the totally H historical cyclone routes based on the distance value set D can be determined by the application processor. It is worth to be noticed that the computation of multiple minimum distance values can be easily performed by determining a minimum value based on the computed distance value set D, each of which minimum distance values actually is a minimum distance between each totally M estimated cyclone center coordinates and a most closest cyclone center coordinate selected from the totally $N=\{N_1, N_2, N_3, \ldots, N_H\}$ cyclone center coordinates for each totally H historical cyclone routes.

Then a selective step is optionally performed to summate the minimum distance between the respective totally H historical cyclone routes and each of the totally M estimated cyclone center coordinates, to form a minimum distance summation set $s=\{s_1, s_2, s_3, \ldots, s_H|s_i=\Sigma_{k=1}^{M}\{d_{ik}\}\}$. Then multiple elements in the minimum distance summation set are ordered from small up to big $S_{sorted}=\{S_1, S_2, S_3, \ldots, S_H|S_i \leq S_j, \forall i<j\}$ to determine the historical cyclone routes ranked within a specific ranking threshold as the reference cyclone routes relevant to the concerned cyclone route. The specific ranking threshold is an integer number in a range between 5 and 20. Due from the aforementioned summation of the minimum distances, the comparison method in accordance with the present invention optionally using the scheme is also to be termed as a minimum distance summation algorithm or a minimum distance summation scheme.

Another selective step can be optionally performed to determine whether the estimated cyclone center coordinates is correspondent to the minimum distance, less than a given radius. If the estimated cyclone center coordinates is determined to be correspondent to the minimum distance less than a given radius, then the estimated cyclone coordinate is voted and to be weighted according to the inputted sequence thereof and with a weighting coefficient w Finally the weighted results for the respective H historical cyclone routes are summated to form a weighted voting summation set $v=\{v_1, v_2, v_3, \ldots, v_H|v_i=\Sigma_{k=1}^{M}\{(1+k\times w)|d_{ik}<r\}\}$ and then multiple elements in the weighted summation set are ordered from big down to small $V_{sorted}=\{V_1, V_2, V_3, \ldots, V_H|V_i \geq V_j, \forall i<j\}$ to determine the historical cyclone routes ranked within a specific ranking threshold as the reference cyclone routes relevant to the concerned cyclone route. The given radius is preferably in a range between 0 and 1 and the weighting coefficient w is preferably in a range between 0 and 1. Due from the aforementioned additional voting determination step and sequence-based weighted step, the comparison method in accordance with the present invention optionally using the scheme is also to be termed as a sequence-weighted voting algorithm or a sequence-based voting scheme. The above-mentioned cyclone events are also referred to one of a typhoon event, a hurricane event and a tropical cyclone event.

In accordance with the above-mentioned method, the comparison device as shown in FIG. 2 is further defined as follows. A comparison device is used for comparison of multiple tropical cyclone routes and includes an application processor and a touch-sensed screen electrically connected with the application processor. The comparison device is capable of determining multiple reference cyclone routes relevant to an concerned cyclone route by comparing each of totally H historical cyclone routes, each of which routes consists of totally $N=\{N_1, N_2, N_3, \ldots, N_H\}$ cyclone center coordinates $P=\{P_1, P_2, P_3, \ldots, P_H\}$, with an estimated cyclone route consisting of totally M estimated cyclone center coordinates for representing the concerned cyclone route.

The touch-sensed display is configured to receive a series of the totally M estimated cyclone center coordinates to form the estimated cyclone route and an estimated coordinate set $U=\{U_1, U_2, U_3, \ldots, U_M|U_k=(x_k,y_k)\}$. The application processor is electrically connected with the touch-sensed display and is configured to compute totally M×H minimum distances between each of the totally M estimated cyclone center coordinates and the respective totally H historical cyclone routes, to render the estimated cyclone center coordinates correspondent to the minimum distance less than a given radius to be weighted and summate the weighted results for the respective H historical cyclone routes, to order the summated results from big down to small, and to select the historical cyclone routes ranked within a specific ranking threshold as the reference cyclone routes relevant to the concerned cyclone route.

Figure 3:
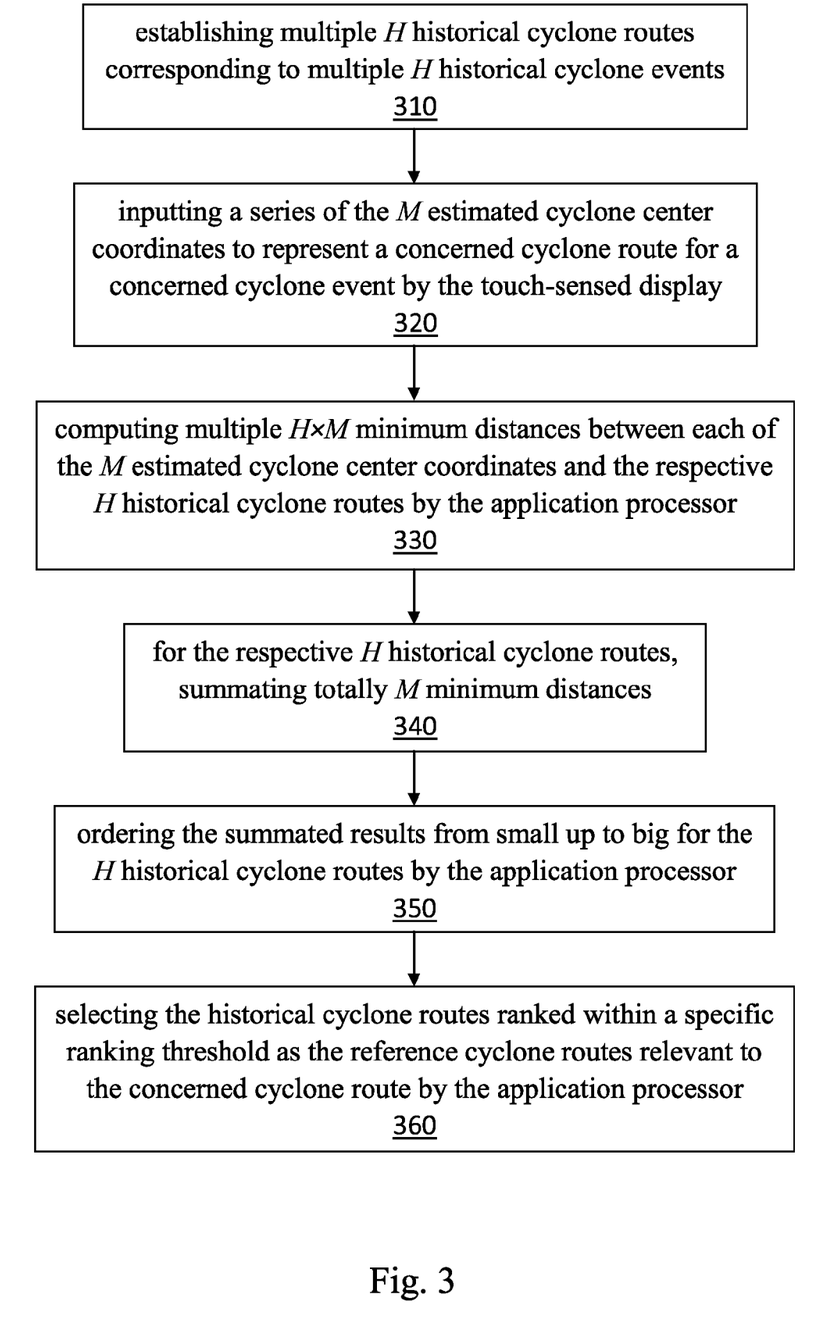
FIG. 3 shows a flow chart illustrating the performing steps regarding the first optional scheme termed as a minimum distance summation scheme in accordance with the present invention.

FIG. 3 shows a flow chart illustrating the performing steps regarding the first optional scheme termed as a minimum distance summation scheme in accordance with the present invention. Step 310 recites establishing multiple H historical cyclone routes corresponding to multiple H historical cyclone events. Step 320 recites inputting a series of the M estimated cyclone center coordinates to represent a concerned cyclone route for a concerned cyclone event by the touch-sensed display. Step 330 recites computing multiple H×M minimum distances between each of the M estimated cyclone center coordinates and the respective H historical cyclone routes by the application processor. Step 340 recites for the respective H historical cyclone routes, summating totally M minimum distances. Step 350 recites ordering the summated results from small up to big for the H historical cyclone routes by the application processor. Step 360 recites selecting the historical cyclone routes ranked within a specific ranking threshold as the reference cyclone routes relevant to the concerned cyclone route by the application processor.

Figure 4:
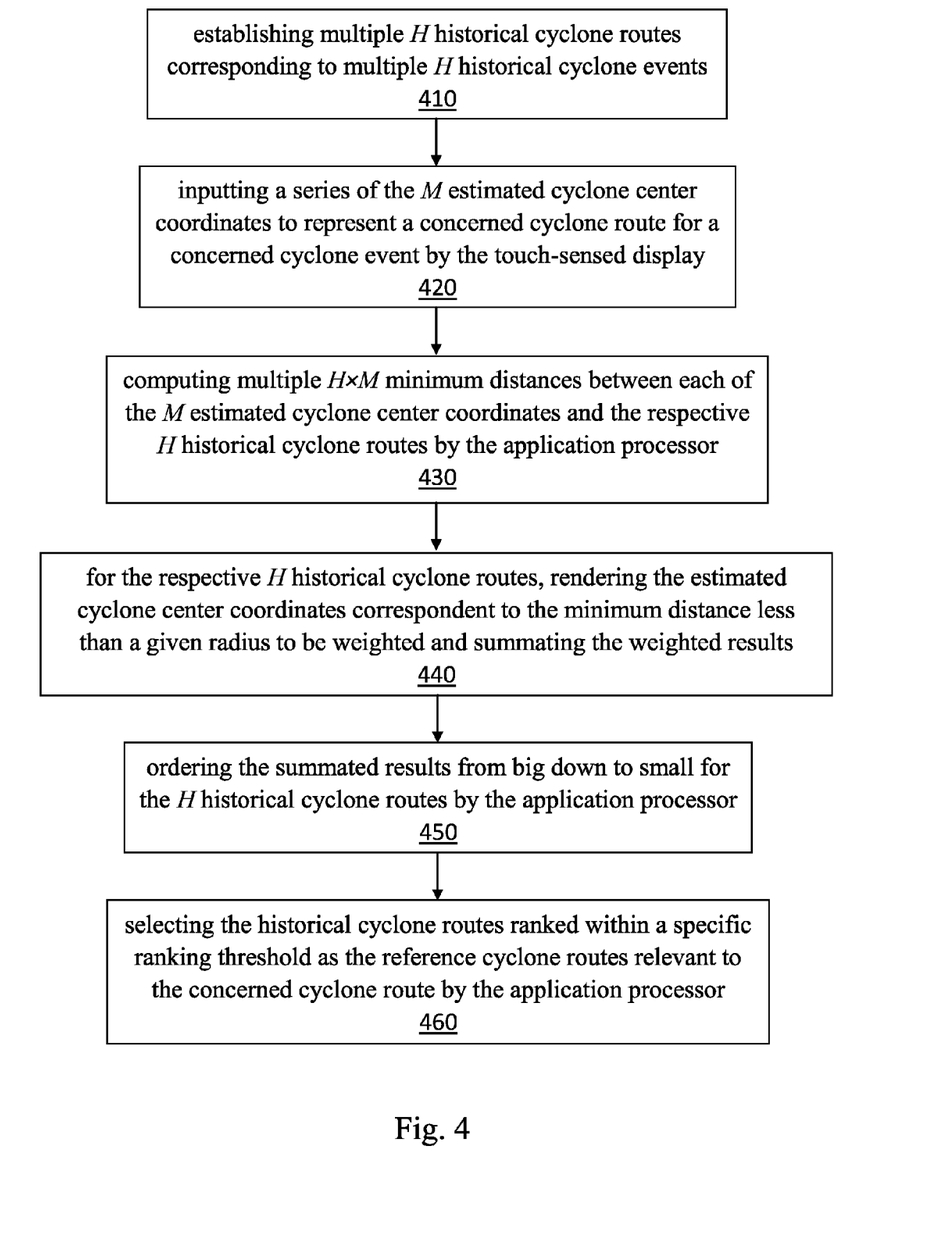
FIG. 4 shows a flow chart illustrating the performing steps regarding the second optional scheme termed as a sequence-based voting scheme in accordance with the present invention.

FIG. 4 shows a flow chart illustrating the performing steps regarding the second optional scheme termed as a sequence-based voting scheme in accordance with the present invention. Step 410 recites establishing multiple H historical cyclone routes corresponding to multiple H historical cyclone events. Step 420 recites inputting a series of the M estimated cyclone center coordinates to represent a concerned cyclone route for a concerned cyclone event by the touch-sensed display. Step 430 recites computing multiple H×M minimum distances between each of the M estimated cyclone center coordinates and the respective H historical cyclone routes by the application processor. Step 440 recites for the respective H historical cyclone routes, rendering the estimated cyclone center coordinates correspondent to the minimum distance less than a given radius to be weighted and summating the weighted results. Step 450 recites ordering the summated results from big down to small for the H historical cyclone routes by the application processor. Step 460 recites selecting the historical cyclone routes ranked within a specific ranking threshold as the reference cyclone routes relevant to the concerned cyclone route by the application processor.

Prior to performing the comparison method, the relevant historical cyclone database for storing data and information regarding all of the historical cyclone events has to be pre-processed and established. The historical cyclone database records such as date, duration, cyclone center coordinate sequence, precipitation distribution and wind speed distribution, for all of the historical cyclone events. During performing the comparison method, the comparison device can remotely access the relevant data and information through wireless communication protocol. Alternatively, the relevant data and information can be also downloaded to and stored in the comparison device prior to performing the comparison method. In this embodiment, the relevant historical cyclone database contains data and information with respect to totally 215 historical typhoon events in the past fifty-five years. By implementing the above-mentioned method for comparison of multiple tropical cyclone routes on the mobile device, the multiple historical cyclone events recorded in the database similar to the concerned cyclone event can be easily and quickly found.

Figure 5A:
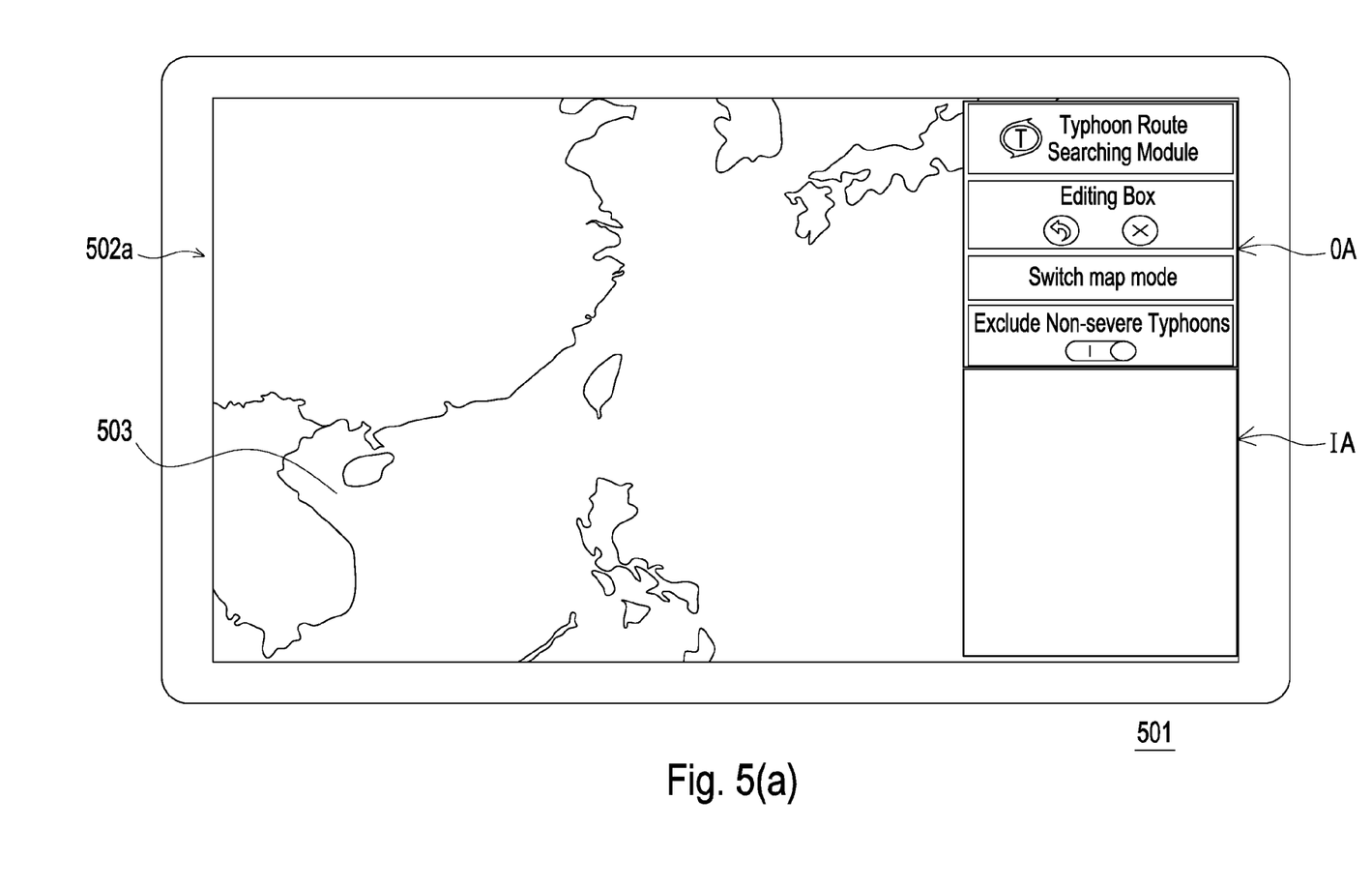
FIG. 5(a) shows a schematic diagram illustrating an initial scene demonstrated on the touch-sensed screen in accordance with the present invention.
Figure 5B:
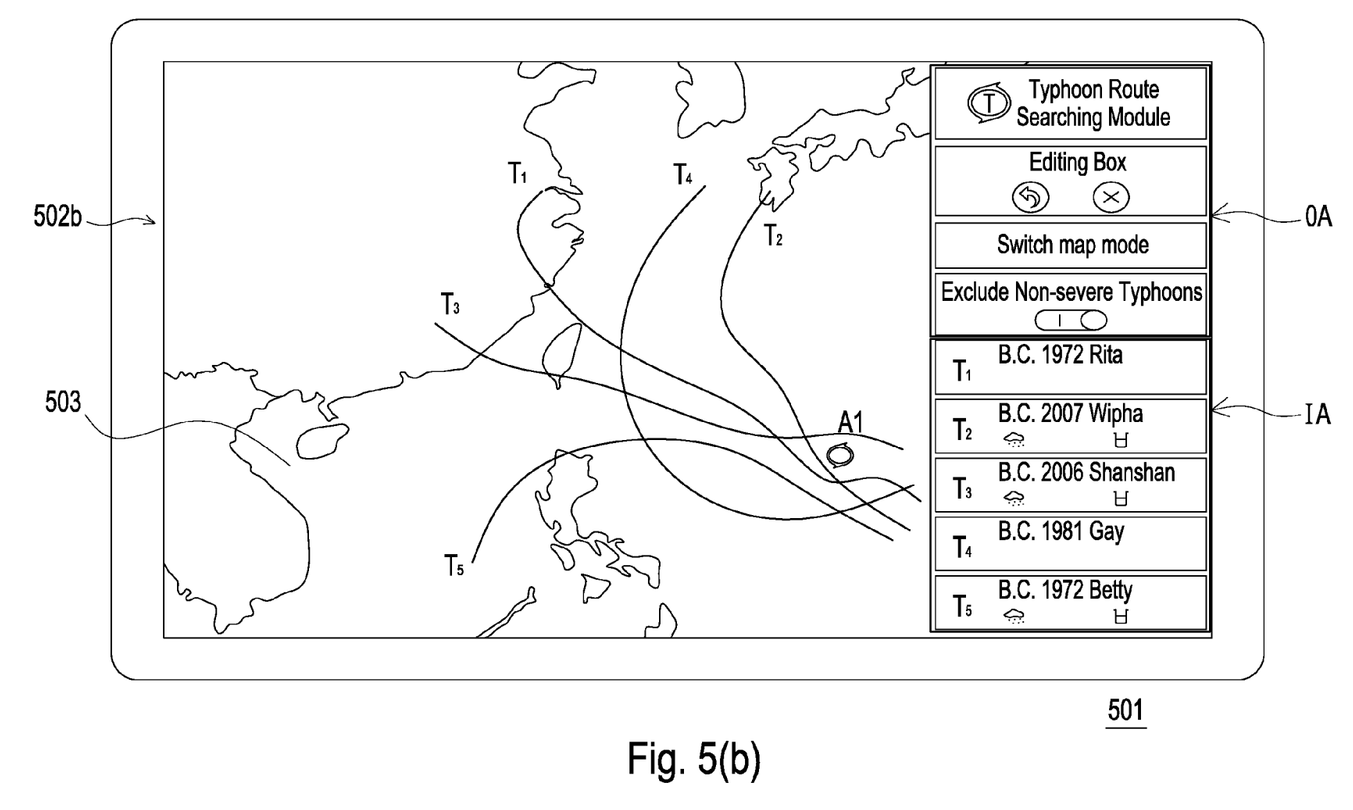
FIG. 5(b) shows a schematic diagram illustrating a single-estimated-point scene demonstrated on the touch-sensed screen in accordance with the present invention.
Figure 5C:
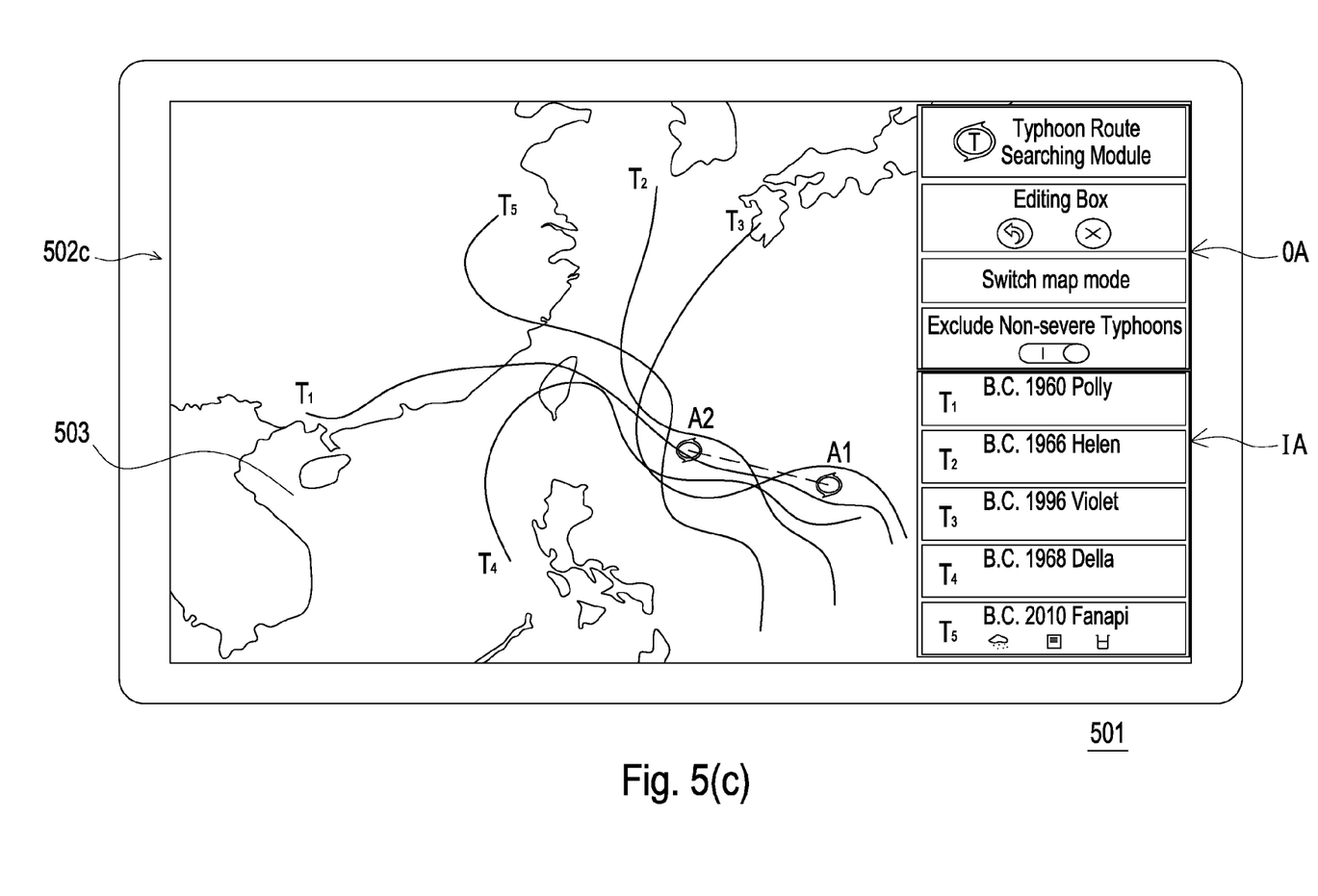
FIG. 5(c) shows a schematic diagram illustrating a dual-estimated-point scene demonstrated on the touch-sensed screen in accordance with the present invention.
Figure 5D:
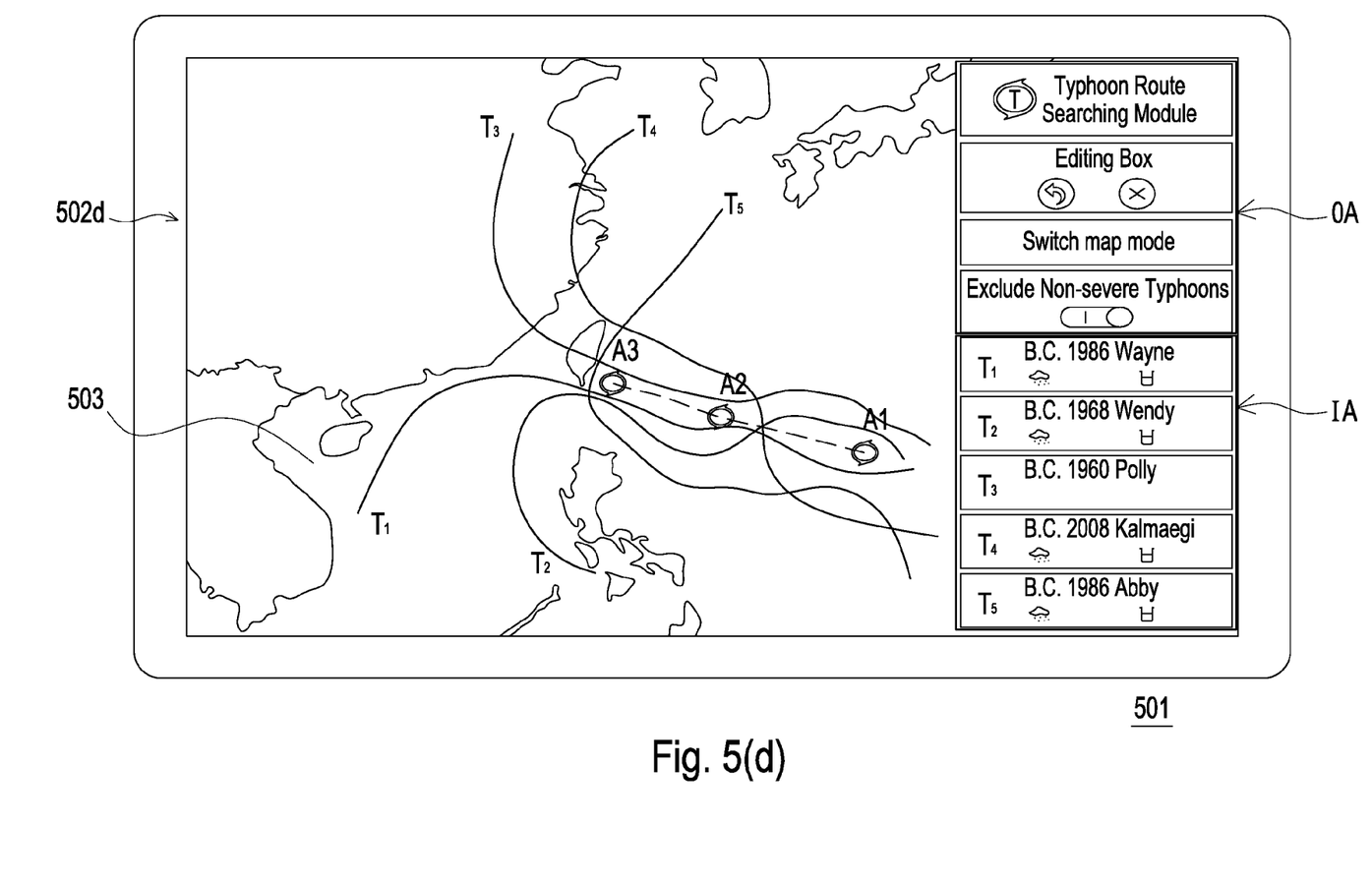
FIG. 5(d) shows a schematic diagram illustrating a triple-estimated-point scene demonstrated on the touch-sensed screen in accordance with the present invention.
Figure 5E:
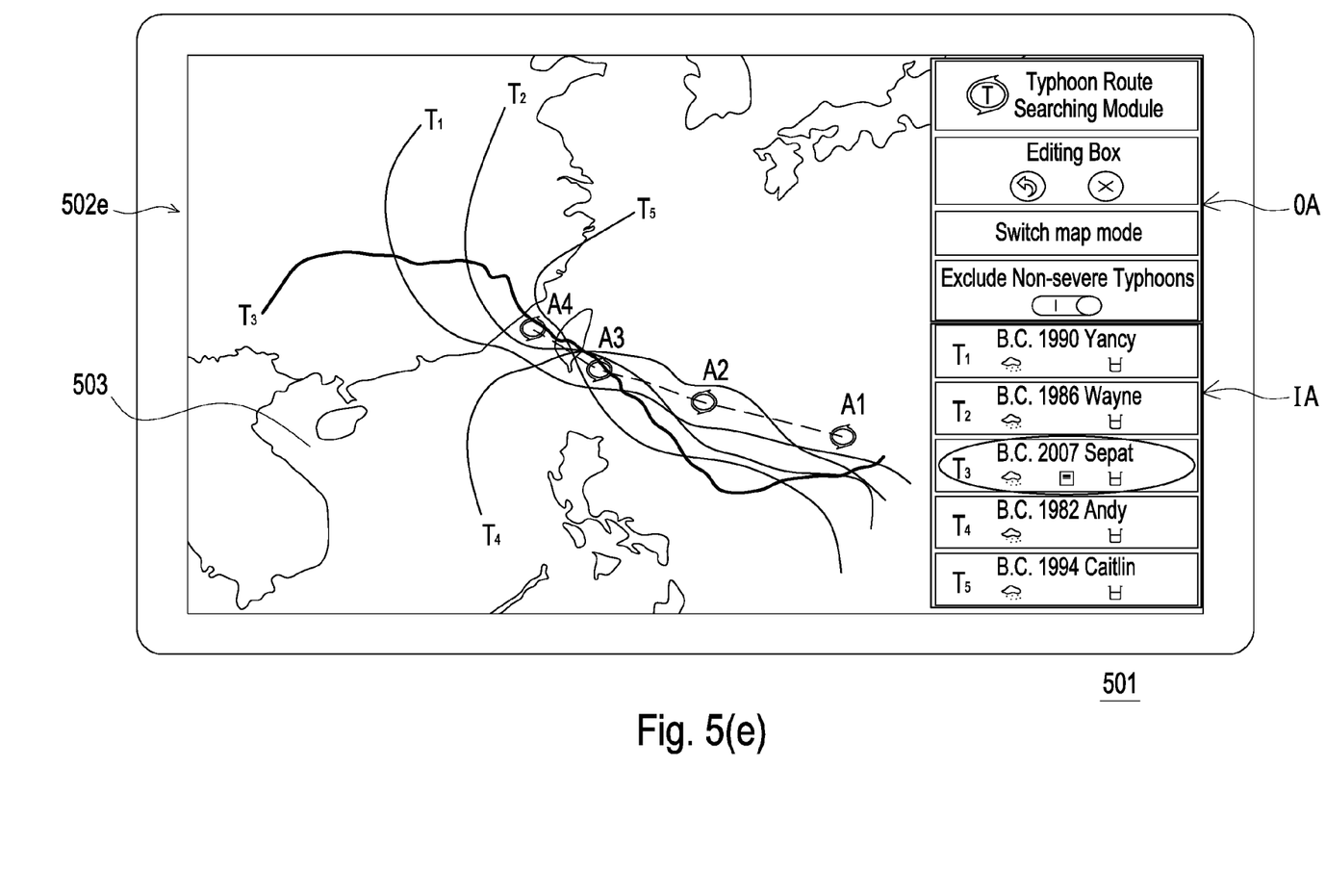
FIG. 5(e) shows a schematic diagram illustrating a quad-estimated-point scene demonstrated on the touch-sensed screen in accordance with the present invention.

FIGS. 5(a) to 5(e) show a series of schematic diagrams illustrating the user interface scene demonstrated on the touch-sensed screen of the comparison device while implementing the comparison method thereon in accordance with the present invention, wherein FIG. 5(a) shows a schematic diagram illustrating an initial scene demonstrated on the touch-sensed screen in accordance with the present invention, FIG. 5(b) shows a schematic diagram illustrating a single-estimated-point scene demonstrated on the touch-sensed screen in accordance with the present invention, FIG. 5(c) shows a schematic diagram illustrating a dual-estimated-point scene demonstrated on the touch-sensed screen in accordance with the present invention, FIG. 5(d) shows a schematic diagram illustrating a triple-estimated-point scene demonstrated on the touch-sensed screen in accordance with the present invention and FIG. 5(e) shows a schematic diagram illustrating a quad-estimated-point scene demonstrated on the touch-sensed screen in accordance with the present invention. The comparison method is implementable on the mobile device as in a format of application program.

When a user initiates an application program for performing the method implemented on a mobile device, an initial user interface scene on the screen first demonstrated to the user is shown as FIG. 5(a). The UI scene 502a shown on the screen 501 includes a map layout 503, which preferably cites the Google Earth data directly, and multiple functional blocks including an operative area OA and an information area IA situated at right hand side column on the screen 501. In FIG. 5(a), the user inputs none of estimated points.

In accordance with map layout 503, the user can autonomously establish an estimated typhoon route representing for the concerned typhoon event by simply touching the touch-sensed screen 501 to input multiple estimated points on the screen. The application program is then activated to perform the comparison method comparing the estimated typhoon route with the historical typhoon routes in real time and immediately demonstrate the multiple selected similar historical typhoon routes and the relevant information thereof on the screen.

In FIG. 5(b), the user touches the touch-sensed screen 501 to input the first possible location by which the concerned cyclone event may pass as the estimated typhoon center coordinate in reference with the map layout. This first estimated cyclone coordinate is shown in the user interface scene 502b in FIG. 5(b) as the point A1. The comparison device immediately performs the comparison method to select top five similar historical tropical cyclone events including typhoon Rita happened B.C. 1972, typhoon Wipha happened B.C. 2007, typhoon Shanshan happened B.C. 2006, typhoon Gay happened B.C. 1981 and typhoon Betty happened B.C. 1972, and shows the route for the respective five historical cyclone events on the screen 501 as the track lines T1, T2 . . . T5 in real time. The information regarding the respective five similar historical tropical cyclone events are shown in information area IA on the screen 501. In FIG. 5(b), the operative area OA is arranged to demonstrate the operative function buttons and the information area IA is arranged to correspondingly demonstrate the data and information regarding the selected top five similar historical tropical cyclone events.

In FIG. 5(c), the user inputs the second estimated cyclone coordinate on the touch-sensed screen 501 as the point A2 as shown in the user interface scene 502c in FIG. 5(c). When the second estimated cyclone coordinate A2 is inputted by the user, the comparison device immediately re-compute the most similar top five historical cyclone events in consideration of the second estimated point and based on the comparison method to obtain and update the most similar top five historical cyclone events, which includes typhoon Polly happened B.C. 1960, typhoon Helen happened B.C. 1966, typhoon Violet happened B.C. 1996, typhoon Della happened B.C. 1968 and typhoon Fanapi happened B.C. 2010, and shows the route for the respective five historical cyclone events on the screen 501 as the track lines T1, T2 . . . T5 in real time. It is worth to be noticed that the secondly updated top five events are different from the first top five events.

Similarly, when the user consequently inputs the third and fourth estimated cyclone coordinates on the touch-sensed screen 501 as the points A3 and A4 as shown in the user interface scenes 502d and 502e in FIG. 5(d) and FIG. 5(e) respectively, the comparison device re-performs the comparison method to update the selected similar historical cyclone events, in consideration of the third and fourth estimated cyclone coordinates.

The user interface in the comparison device can be further designed to provide users the instant inquiry for the selected historical cyclone events. For example, in the user interface 502e in FIG. 5(e), the user can simply touch the T3 block in the information area IA for showing the historical cyclone event T3 ranked in the third place. Once the user touches the T3 block, an information frame (not shown in FIG. 5(e)) can be shown in the user interface 502e. In the information frame, it may demonstrate more detailed information regarding the historical cyclone event T3, that is, typhoon Sepat occurred in summer season B.C. 2007, such as the intensity of typhoon, the level of the typhoon warning, the period of typhoon warning and the contents of the typhoon warning etc., which can be easily planed and designed in dependent upon users' demands. Furthermore, inside the information frame, it also provides more instant inquiry function. The user can touches small designed icons inside the information frame to further acquire information such as, the distribution and amount of the precipitation, the wind speed and the real-time water level in the specific reservoir etc.

To sum up, the present invention further has the advantages as follows.

(1) The instantaneity: The required data and information is pre-processed as ready to use prior to performing the comparison method. As if the certain disaster is going to occur during the concerned cyclone event, the relevant required information can be immediately available to the user. Furthermore, if the tropical cyclone suddenly turns its movement to different direction, the present comparison device and method can easily do the re-estimation for the new route and quickly find out the relevant data and information.

(2) The usability: The comparison device and method is designed and developed based upon an explicit understanding of the user-centered design (UCD) concept and approach. Therefore, the comparison device and method is very easy to use for any user. Especially the friendly and simplified user interface provides an intuitive operation experience to any user.

(3) The fault tolerance: The comparison device and method provides undo function, which allows user to undo or to be back to the previous state. If the user makes some operative mistakes, she/he can easily go back or recovery to the latest state.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A method for comparison of multiple tropical cyclone routes, which is implementable through a mobile device having an application processor and a touch-sensed display, to determine multiple reference cyclone routes for a concerned cyclone route comprising:
   establishing multiple H historical cyclone routes, which are recorded and saved in a form of matrix in a memory on the mobile device, corresponding to multiple H historical cyclone events;
   showing a geographical schematic map on the touch-sensed display;
   providing a user to input a series of the M estimated cyclone center coordinates to represent the concerned cyclone route for a concerned cyclone event directly on the geographical schematic map shown on the touch-sensed display by touching the touch-sensed display, simply according to one's own subjective estimation of the user to the concerned cyclone route, and recording and saving M in a form of matrix in the memory on the mobile device;
   computing multiple H×M minimum distances between each of the M estimated cyclone center coordinates and the respective H historical cyclone routes, in which each of the M estimated cyclone center coordinates is correspondent to H minimum distances and each of H historical cyclone routes is correspondent to M minimum distances, by the application processor;
   for the respective H historical cyclone routes, rendering the estimated cyclone center coordinates correspondent to the minimum distance less than a given radius to be weighted and summating the weighted results;
   ordering the summated results from large down to small for the H historical cyclone routes by the application processor; and
   selecting the historical cyclone routes ranked within a specific ranking threshold as the reference cyclone routes relevant to the concerned cyclone route by the application processor.

2. The method as claimed in claim 1, being capable of determining multiple reference cyclone routes relevant to the concerned cyclone route by comparing each of H historical cyclone routes, each of which routes consists of totally $N=\{N_1, N_2, N_3, \ldots, N_H\}$ cyclone center coordinates $P=\{P_1, P_2, P_3, \ldots, P_H\}$, with an estimated cyclone route consisting of M estimated cyclone center coordinates for representing the concerned cyclone route, comprising:
   inputting a series of the M estimated cyclone center coordinates to form the estimated cyclone route and an estimated coordinate set $U=\{U_1, U_2, U_3, \ldots, U_M | U_k = (x_k, y_k)\}$ by the touch-sensed display;
   computing M×H minimum distances between each of the M estimated cyclone center coordinates and the respective H historical cyclone routes by the application processor;
   for the respective H historical cyclone routes, weighting according to the inputted sequence and with a weighting coefficient w for the estimated cyclone center coordinates selected from the M estimated cyclone center coordinates and correspondent to the minimum distance less than a given radius and summating the weighted result; and
   ordering the summated results from big down to small for the H historical cyclone routes by the application processor.

3. The method as claimed in claim 1, being capable of determining multiple reference cyclone routes relevant to an concerned cyclone route by comparing each of H historical cyclone routes, each of which routes consists of $N=\{N_1, N_2, N_3, \ldots, N_H\}$ cyclone center coordinates, with an estimated cyclone route consisting of M estimated cyclone center coordinates, further comprising steps of:
   (a) inputting a series of the M estimated cyclone center coordinates to form the estimated cyclone route and an estimated coordinate set $U=\{U_1, U_2, U_3, \ldots, U_M | U_k = (x_k, y_k)\}$ by the touch-sensed display;
   (b) forming multiple coordinate sequence sets $P=\{P_1, P_2, P_3, \ldots, P_H\}$ for the H historical cyclone routes, each of which sets $P_i = P_{i1}, P_{i2}, P_{i3}, \ldots, P_{iN_i} | P_{ij} = (x_{ij}, y_{ij})\}$ includes the $N=\{N_1, N_2, N_3, \ldots, N_H\}$ cyclone center coordinates, each of which coordinates is periodically recorded at the end of each invariant time interval;
   (c) computing multiple distance values, each of which values is a linear distance between $j^{th}$ cyclone center coordinates of the $N=\{N_1, N_2, N_3, \ldots, N_H\}$ cyclone center coordinates for $i^{th}$ historical cyclone route of the H historical cyclone routes and $k^{th}$ estimated cyclone center coordinate of the M estimated cyclone center coordinates, to form a distance value set $$D = \left\{ \begin{array}{l} D_{i11}, D_{i12}, D_{i13}, \ldots, D_{i1M}, \\ D_{i21}, D_{i22}, D_{i23}, \ldots, D_{i2M}, \\ D_{i31}, D_{i32}, D_{i33}, \ldots, D_{i3M}, \\ \ldots \\ D_{iN_i1}, D_{iN_i2}, D_{iN_i3}, \ldots, D_{iN_iM} \end{array} \middle| D_{ijk} = |P_{ij} - U_k| \right\}$$

by the application processor;

(d) determining multiple minimum distances $$d_{ik} = min_j \left( D_{ijk} \left| \begin{array}{l} i = 1, 2, 3, \ldots, H; \\ j = 1, 2, 3, \ldots, N_i; \\ k = 1, 2, 3, \ldots, M \end{array} \right. \right)$$

between $k^{th}$ estimated cyclone center coordinate of the M estimated cyclone center coordinates and $i^{th}$ historical cyclone route of the H historical cyclone routes based on the distance value set D;

(e) selectively summating the M minimum distances for the respective H historical cyclone routes to form a minimum distance summation set $s=\{s_1, s_2, s_3, \ldots, s_H | s_i = \Sigma_{k=1}^{M}\{d_{ik}\}\}$ and ordering multiple elements in the minimum distance summation set from small up to big $S_{sorted}=\{S_1, S_2, S_3, \ldots, S_H | S_i \leq S_j, \forall i<j\}$ to determine the historical cyclone routes ranked within a specific ranking threshold as the reference cyclone routes relevant to the concerned cyclone route; and (f) selectively for the respective H historical cyclone routes, weighting according to the inputted sequence and with a weighting coefficient w for the estimated cyclone center coordinates correspondent to the minimum distance, less than the given radius, and summating the weighted results to form a weighted summation set $v=v_1, v_2, v_3, \ldots, v_H | v_i = \Sigma_{k=1}^{M}\{(1+k \times w) | d_{ik} < r\}\}$ and ordering multiple elements in the weighted summation set from big down to small $V_{sorted}=\{V_1, V_2, V_3, \ldots, V_H | V_i \geq V_j, \forall i<j\}$ to determine the historical cyclone routes ranked within the specific ranking threshold from the H historical cyclone routes as the reference cyclone routes relevant to the concerned cyclone route.

4. The method as claimed in claim 3, wherein the step (c) further comprises step of:

(g) computing multiple minimum distance values by determining a minimum value based on the computed distance value set, each of which values is a minimum distance between each M estimated cyclone center coordinates and a most closest cyclone center coordinate selected from the $N=\{N_1, N_2, N_3, \ldots, N_H\}$ cyclone center coordinates for each H historical cyclone routes.

5. The method as claimed in claim 1, wherein the specific ranking threshold is an integer number in a range between 5 and 20.

6. The method as claimed in claim 1, wherein the given radius is in a range between 0 and 1.

7. The method as claimed in claim 1, wherein the weighting coefficient w is in a range between 0 and 1.

8. The method as claimed in claim 1, wherein the historical cyclone events are referred to one of a typhoon event, a hurricane event and a tropical cyclone event.

9. A device for comparison of multiple tropical cyclone routes, which is capable of determining multiple reference cyclone routes relevant to an concerned cyclone route by comparing each of H historical cyclone routes, which are recorded and saved in a form of matrix in a memory on the device, each of which routes consists of $N=\{N_1, N_2, N_3, \ldots, N_H\}$ cyclone center coordinates $P=\{P_1, P_2, P_3, \ldots, P_H\}$, with an estimated cyclone route consisting of M estimated cyclone center coordinates for representing the concerned cyclone route, comprising:

a touch-sensed display configured to show a geographical schematic map and to receive a series of the M estimated cyclone center coordinates inputted from a user by directly touching the geographical schematic map shown on touching the touch-sensed display, simply according to one's own subjective estimation of the user to the concerned cyclone route, and recording and saving M in a form of matrix in the memory on the device, to form the estimated cyclone route and an estimated coordinate set $U=\{U_1, U_2, U_3, \ldots, U_M | U_k = (x_k, y_k)\}$; and an application processor electrically connected with the touch-sensed display and configured to compute M×H minimum distances between each of the M estimated cyclone center coordinates and the respective H historical cyclone routes, to render the estimated cyclone center coordinates correspondent to the minimum distance less than a given radius to be weighted and summate the weighted results for the respective H historical cyclone routes, to order the summated results from large down to small, and to select the historical cyclone routes ranked within a specific ranking threshold as the reference cyclone routes relevant to the concerned cyclone route.

10. The device as claimed in claim 9 being one selected form a mobile device, a smart phone, a tablet computer, a phablet and a notebook computer with a touch screen.

* * * * *